(12) United States Patent
Bergström et al.

(10) Patent No.: US 9,769,782 B2
(45) Date of Patent: Sep. 19, 2017

(54) CONFIGURATION MANAGEMENT OUTSIDE A COVERAGE AREA

(71) Applicant: Telefonaktiebolaget L M Ericsson, Stockholm (SE)

(72) Inventors: Mattias Bergström, Stockholm (SE); Håkan Persson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/156,703

(22) Filed: Jan. 16, 2014

(65) Prior Publication Data

US 2014/0199983 A1 Jul. 17, 2014

Related U.S. Application Data

(60) Provisional application No. 61/753,575, filed on Jan. 17, 2013.

(51) Int. Cl.
*H04M 3/00* (2006.01)
*H04W 64/00* (2009.01)
*H04W 8/20* (2009.01)

(52) U.S. Cl.
CPC ............. *H04W 64/00* (2013.01); *H04W 8/20* (2013.01)

(58) Field of Classification Search
CPC ..................................................... H04W 64/00
See application file for complete search history.

(56) References Cited

U.S. PATENT DOCUMENTS

| | | | |
|---|---|---|---|
| 2007/0218906 A1* | 9/2007 | Melia | H04W 36/30 455/436 |
| 2011/0044253 A1* | 2/2011 | Zisimopoulos | H04W 48/16 370/328 |
| 2012/0188949 A1* | 7/2012 | Salkintzis | H04L 45/308 370/329 |
| 2013/0089073 A1* | 4/2013 | Zhu | H04W 36/0022 370/331 |
| 2013/0095789 A1* | 4/2013 | Keevill | H04W 12/06 455/411 |
| 2013/0095820 A1* | 4/2013 | Yasuda | H04W 36/0088 455/426.1 |
| 2013/0208713 A1* | 8/2013 | Hamade | H04W 88/08 370/338 |

* cited by examiner

Primary Examiner — Idowu O Osifade (57) ABSTRACT

According to some embodiments, a wireless communication device within a coverage area of a first network is configured to act according to first configuration information associated with the first network. The wireless communication device detects when it has moved outside the coverage area of the first network and, in response, applies an out-of-coverage configuration management rule. The rule indicates how to manage the first configuration information outside the coverage area of the first network.

23 Claims, 5 Drawing Sheets

CONFIGURATION MANAGEMENT OUTSIDE A COVERAGE AREA

RELATED APPLICATIONS

This application claims the benefit of priority of U.S. Provisional Patent Application No. 61/753,575 filed on Jan. 17, 2013.

TECHNICAL FIELD

Particular embodiments relate generally to configuration management in a radio access network and more particularly to configuration management outside a coverage area.

BACKGROUND

Wireless communication devices, such as mobile phones and portable computers, communicate with radio access networks according to radio access technology. Examples of radio access technologies include 3GPP technology (e.g., UMTS and Long Term Evolution (LTE)), IEEE 802.11 technology (Wi-Fi), Bluetooth technology, or other technology. A wireless communication device may support connections to more than one radio access technology, simultaneously or one at the time.

SUMMARY

According to some embodiments, a wireless communication device within a coverage area of a first network is configured to act according to first configuration information associated with the first network. The wireless communication device detects when it has moved outside the coverage area of the first network and, in response, applies an out-of-coverage configuration management rule. The rule indicates how to manage the first configuration information outside the coverage area of the first network.

Some embodiments of the disclosure may provide one or more technical advantages. A technical advantage of certain embodiments may provide an out-of-coverage configuration management rule that indicates how a wireless communication device should manage configuration information when it moves outside a coverage area of a network. The out-of-coverage rule can be tailored to various coverage scenarios in order to optimize performance for the wireless communication device itself as well as for the network as a whole. Thus, the out-of-coverage rule may indicate to discard configuration information, refrain from acting according to the configuration information, maintain the configuration information, or resume acting according to the configuration information depending on the coverage scenario. As an example, the out-of-coverage rule may manage short term out-of-coverage scenarios differently than long term out-of-coverage scenarios. As another example, the out-of-coverage rule may manage coverage overlap scenarios differently depending on whether two networks have full, partial, or no coverage overlap. Particular implementations of the proposed solutions can increase uniformity throughout the network such that similarly situated devices (e.g., devices with similar capabilities and subscription levels using similar services in similar coverage and network conditions) behave in substantially the same way when moving out of coverage.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Wireless communication devices, such as mobile phones and portable computers, communicate with radio access networks according to radio access technology. Examples of radio access technologies include 3GPP technology (e.g., UMTS and Long Term Evolution (LTE)), IEEE 802.11 technology (Wi-Fi), Bluetooth technology, or other technology. As will be appreciated by those skilled in the art from the context, references in the explanation below to radio access technologies (such as 3GPP, WLAN, and Wi-Fi radio access technologies) may refer to access networks (e.g. RANs) operating according to the radio access technologies. Thus, references to operations performed by a radio access technology (e.g. the transmission of thresholds and/or conditions, the transmission of traffic steering commands, the steering of traffic to the radio access technology, etc.) refers to those operations being performed by a network operating according to the radio access technology.

A wireless communication device may support connections to more than one radio access technology, simultaneously or one at the time. One radio access technology may serve as a master that instructs the wireless communication device how and when to connect to one or more other radio access technologies. To instruct the wireless communication device, the master may send configuration information, such as a policy comprising a set of rules for selecting an access node to connect to when multiple access nodes are available. As an example, a 3GPP network may serve as the master and may send a policy instructing the wireless communication device to connect to a 3GPP access node during the times that certain conditions are met and to connect to a Wi-Fi access node during the times that such conditions are not met.

Embodiments of the present disclosure may provide techniques for managing configuration information in the event that the wireless communication device moves outside the coverage area of the master network. In some embodiments, a wireless communication device may apply an out-of-coverage configuration management rule that indicates, for example, when to continue to apply the current configuration information, when to store the current configuration information and/or apply different configuration information, when to resume use of a previously stored configuration information, when to discard configuration information, and so on. Efficient management of configuration information may reduce the likelihood of the wireless communication device applying a configuration that degrades the performance of the wireless communication device itself or of the network as a whole. Particular embodiments are described in FIGS. 1-5 of the drawings, like numerals being used for like and corresponding parts of the various drawings.

Figure 1:
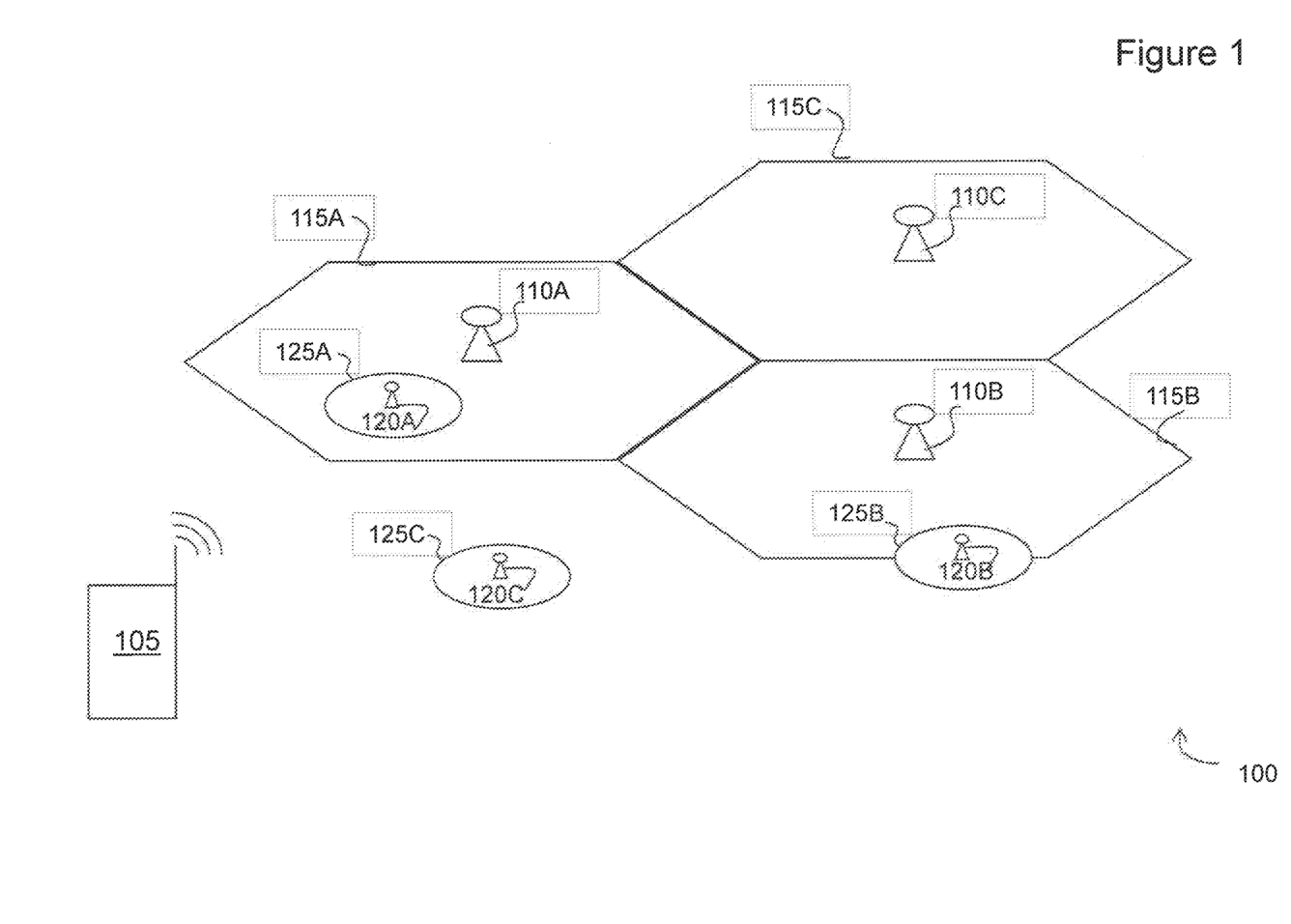
FIGS. 1 and 2 are block diagrams illustrating embodiments of a network.

FIG. 1 is a block diagram illustrating embodiments of a network 100. FIG. 1 includes a wireless communication device 105 that supports communication with a first network and a second network. The first network comprises access nodes 110 and the second network comprises access nodes 120. For purposes of illustration, access nodes 110 may be configured as 3GPP access nodes 110A-110C and second network access nodes 120 may be configured as Wi-Fi access nodes 120A-120C. In alternative embodiments, access nodes 110 and access nodes 120 could be configured according to any suitable radio access technology. In addition, first network access nodes 110 may be configured according to the same radio access technology as second network access nodes 120 (e.g., two separate 3GPP networks or two separate Wi-Fi networks) or a different radio access technology.

Each access node has an associated coverage area. When wireless communication device 105 is located within a coverage area of a particular access node, it is capable of communicating with that access node. As illustrated, 3GPP access nodes 110A, 110B, and 110C correspond to 3GPP coverage areas 115A, 115B, and 115C, respectively. Similarly, Wi-Fi access nodes 120A, 120B, and 120C correspond to Wi-Fi coverage areas 125A, 125B, and 125C, respectively. The coverage areas of all of the access nodes that make up a network may be combined to provide the overall coverage of the network. In FIG. 1, the combined coverage of areas 115A, 115B, and 115C correspond to the overall coverage of the 3GPP network and the combined coverage of areas 125A, 125B, and 125C correspond to the overall coverage of the Wi-Fi network.

The coverage area of the first network may or may not overlap the coverage area of the second network. As illustrated in FIG. 1, Wi-Fi access node 120A has a full coverage overlap with 3GPP access node 110A (scenario A), Wi-Fi access node 110B has partial coverage overlap with 3GPP access node 110B (scenario B), and Wi-Fi access node 120C has no coverage overlap with any 3GPP coverage (scenario C). Throughout this document, scenario A, B and C will refer to full, partial, and no coverage overlap between the two networks, respectively. Scenario C may (intermittently) include locations where the 3GPP coverage is lost due to a temporary coverage hole (small or big). The duration of time that wireless communication device 105 spends in the coverage hole can be long or short depending on the movement of wireless communication device 105 or objects obstructing the propagation paths that create short outages or other unavailability (e.g., control channels are available but no traffic can be provided).

When wireless communication device 105 is within the coverage area of multiple access nodes 110 and/or 120, it applies configuration information to select an access node for connection, to determine settings to use when connecting to the access node, to set mobility related parameters, and/or to configure any other suitable polices, rules, or settings. Examples of mobility related parameters include thresholds indicating under which conditions wireless communication device 105 should "handover" between the 3GPP network and the Wi-Fi network. In some Wi-Fi/3GPP mobility contexts, "handover" could refer to a handover, handoff, or transfer of an ongoing call or data session, or "handover" could also refer to connecting to and/or steering traffic between the Wi-Fi network and the 3GPP network.

In certain embodiments, configuration information may comprise a policy that instructs wireless communication device 105 how to select between different radio access technologies. The policy could provide rules indicating when to connect to and/or steer traffic to a 3GPP access node 110 and when to connect to and/or steer traffic to a Wi-Fi access node 120. The policy could also dictate or guide wireless communication device 105 how to select between two or more particular access nodes. For example, if wireless communication device 105 is within range of access nodes 110A, 110B, and 120A, the policy may provide rules for selecting among these particular access nodes.

In some embodiments, wireless communication device 105 applies configuration information obtained during a connection. As an example, wireless communication device 105 may connect to 3GPP access node 110A and receive policy A. Wireless communication device 105 may later disconnect from access node 110A and enter idle mode. The next time that wireless communication device 105 connects to a network, it may or may not apply policy A depending on whether or not device 105 has remained within the coverage area of the 3GPP network (or a particular access node in the 3GPP network, such as 3GPP access node 110A) and, if device 105 has moved out of coverage, further depending on an out-of-coverage configuration management rule for policy A as discussed in more detail below.

Figure 2:
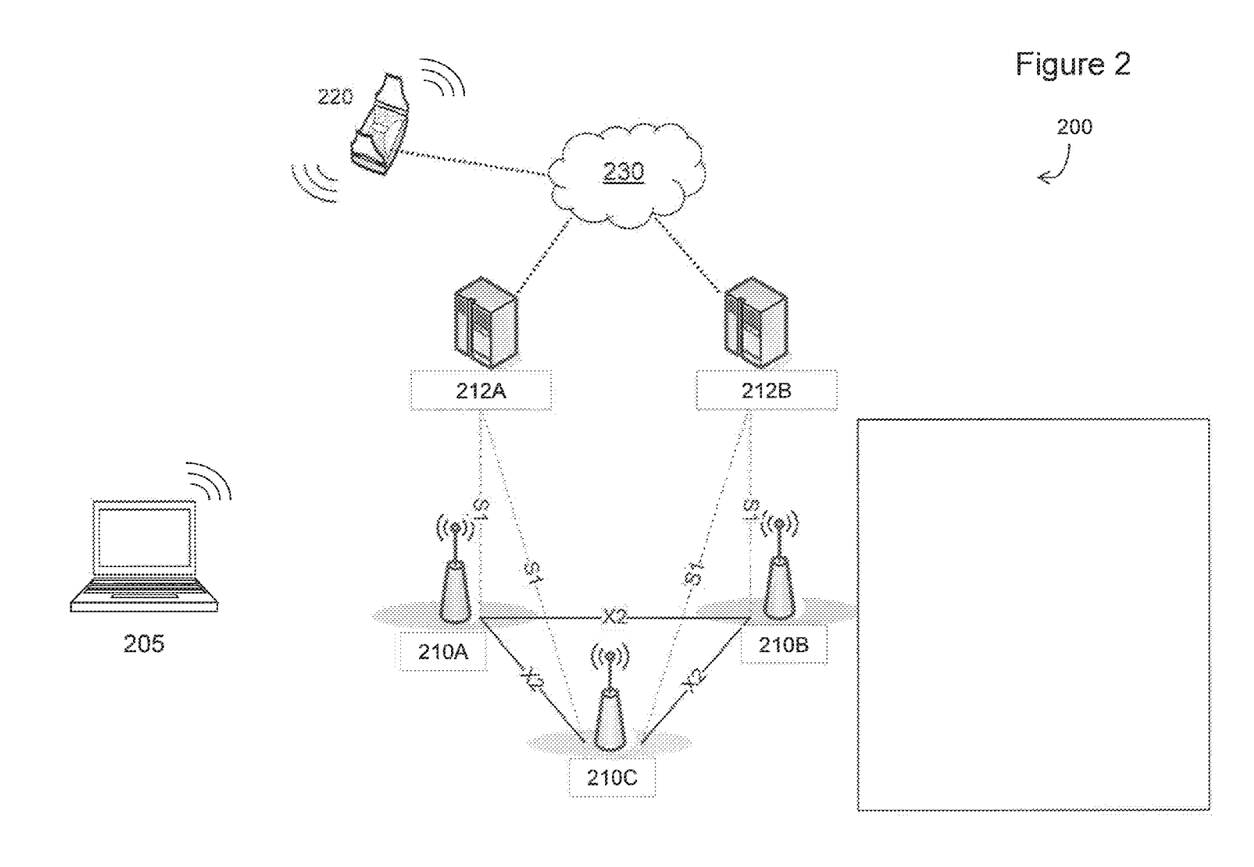

FIG. 2 is a block diagram illustrating embodiments of a network 200. Network 200 illustrates one example of a network that facilitates configuration management outside a coverage area. For purposes of illustration, network 200 comprises a 3GPP radio network, such as an LTE network, and a Wi-Fi radio network. However, the solutions and issues described herein may be applied to any suitable types of radio networks and radio access technologies.

In some embodiments, network 200 comprises a 3GPP radio network, such as an evolved UMTS Terrestrial Radio Access Network (E-UTRAN). The E-UTRAN includes access nodes (base stations) called "enhanced NodeBs"/eNBs/eNodeBs 210. The eNBs 210 provide the E-UTRA user plane and control plane protocol terminations towards a wireless communication device, such as User Equipment/UE 205. The eNBs 210 are interconnected with each other by means of the X2 interface. The eNBs 210 are also connected by means of the S1 interface to an Evolved Packet Core (EPC). More specifically, the eNBs 210 connect to one or more Mobility Management Entities/MMEs 212 by means of the S1-MME interface and to a Serving Gateway (S-GW) by means of the S1-U interface. The S1 interface supports a many-to-many relation between MMEs 212, S-GWs, and eNBs 210.

The eNB 210 hosts functionalities such as Radio Resource Management (RRM), radio bearer control, admission control, header compression of user plane data towards serving gateway, and routing of user plane data towards the serving gateway. MME 212 is the control node that processes the signaling between UE 205 and a core network, such as network 230. Network 230 may comprise (or connect to) a public switched telephone network (PSTN), the Internet, and/or any other core network. The main functions of MME 212 are related to connection management and bearer management, which are handled via Non Access Stratum (NAS) protocols. The S-GW is the anchor point for UE 205 mobility. The S-GW includes other functionalities, such as temporary downlink data buffering while UE 205 is being paged, packet routing and forwarding to the right eNB 210, and gathering of information for charging and lawful interception. The PDN Gateway (P-GW) allocates IP addresses to UEs 205 and enforces Quality of Service (QoS). Details of the functionalities of certain embodiments of the different nodes may be found in the 3GPP TS 36.300 technical specification.

In FIG. 2, network 200 further comprises a Wi-Fi radio network (which may also be called a wireless local area network (WLAN)). The Wi-Fi radio network includes one or more access nodes, such as Wi-Fi Access Point/Wi-Fi AP 220. In some embodiments, a lean architecture may be employed in the user plane where UE 205 (which may also be referred to as station/STA 205) connects to Wi-Fi AP 220 and Wi-Fi AP 220 in turn connects directly to network 230 (e.g., the Internet). In the control plane, an Access point Controller (AC) can handle the management of one or more Wi-Fi APs 220. An Authentication, Authorization and Accounting (AAA) entity can handle security and/or authentication of users. For example, centralized AAA management can be provided according to a Remote Administration Dial In User Service (RADIUS) protocol (RFC 2865).

In some embodiments, the coverage area of Wi-Fi APs 220 may fully or partially overlap the coverage area of eNBs 210. This may allow for offloading traffic from the mobile network (e.g., the 3GPP network) to the Wi-Fi network or vice versa. Mobile network operators may decide to offload traffic to the Wi-Fi network for various reasons. Offloading traffic to the Wi-Fi network may provide additional frequency, for example, Wi-Fi can provide mobile network operators with an additional 85 MHz in the 2.4 GHz band and another (close to) 500 MHz in the 5 GHz band. Offloading traffic to the Wi-Fi network may provide cost benefits. Wi-Fi uses unlicensed frequencies that are free of charge, and the costs associated with deploying and operating a Wi-Fi AP tend to be lower than the costs associated with deploying and operating an eNB. Additionally, mobile network operators can take advantage of already deployed Wi-Fi APs available in public hotspots such as train stations, airports, stadiums, shopping malls, etc. In addition, some end users may already have Wi-Fi available in their homes, for example, as part of a flat rate home broadband subscription. Offloading traffic to the Wi-Fi network may also provide high data transmission rates. For example, under low interference conditions and assuming the user is close to the Wi-Fi AP, Wi-Fi can theoretically provide peak data rates up to at least 600 Mbps, for example, for IEEE 802.11n deployments with Multiple Input Multiple Output (MIMO). Finally, offloading traffic to the Wi-Fi network may allow for use of commercially available UEs because most UEs currently available in the market support Wi-Fi.

Wi-Fi can be deployed in various scenarios, such as private Wi-Fi, public Wi-Fi, and integrated Wi-Fi. Private Wi-Fi may refer to a residential or enterprise deployment where the end user controls access selection, operator services are supported over the top and/or with S2b (or S2c), and no charge applies to the radio connection between the end user and the Wi-Fi AP. Public Wi-Fi deployments may refer to 3rd Party or Operator/Shared hotspots. In public Wi-Fi, access selection may depend on roaming agreements, the end user, etc. It may be possible to use HS2.0 mechanism for authentication (EAP-SIM) and roaming. In public Wi-Fi, operator services may be supported over the top and/or with S2b (or S2c), and charging models may include flat-rate charging and/or bucket charging (which differ from charging models typically used in cellular). Integrated Wi-Fi may refer to a deployment of Wi-Fi as a part of a heterogeneous network, such as a network that includes both 3GPP and Wi-Fi access nodes that are operated by a common operator. Integrated Wi-Fi may allow for seamless Wi-Fi offloading experience for end user (the user does not need to care about which interfaces are used for the traffic). The operator services may be supported using smart service selection and user plane integration (e.g. S2a, S2b over trusted Wi-Fi). In an integrated Wi-Fi deployment, it may be possible to optimize the network performance and the end user experience, provide a similar charging model for multiple radio access technologies, and (in the future) support seamless IP session continuity.

In some embodiments, UE 205 may receive information about the 3GPP radio network and/or the Wi-Fi radio network from an Access Network Discovery and Selection Function (ANDFS). ANDFS is an entity introduced in 3GPP TS 23.402 Release 8 to provide UE 205 with information, such as access network information and access discovery information, mobility policies, and routing policies. The communication between the UJE and the ANDSF server is defined as an IP-based S14-interface. By supplying UE 205 with information about available access networks (both 3GPP and non-3GPP), the ANDSF enables an energy-efficient mechanism of network discovery in which the UE can avoid continuous and energy-consuming background scanning. Furthermore, the ANDSF can provide the mobile operators with a tool for guiding UEs 205 to select one particular radio access network (RAN) over another according to a policy. However, ANDSF requires proper OS support and priority over other applications. If these requirements are not met, ANDSF control can be somewhat unreliable.

The ANDSF supplies three types of information: discovery information, inter-system mobility policies (ISMP), and inter-system routing policies (ISRP). The three types of information are summarized and implemented via ANDSF managed objects (MO), which are communicated to the UEs via an over-the-top (OTT) signaling channel, as SOAP-XML messages.

Discovery information provides UE 205 with information regarding the availability of different radio access technologies in the vicinity of UE 205. This helps UE 205 discover available (3GPP and non-3GPP) access networks without the burden of continuous background scanning. Inter-System Mobility Policies (ISMP) are policies that guide UE 205 to select the most preferable 3GPP or non-3GPP access. The ISMPs are used for UEs 205 that access a single access (e.g., 3GPP or Wi-Fi) at a time. If, however, UE 205 supports connection to several access networks at the same time, the operator can use the third type of information, ISRP, to increase the granularity of the RAN selection. ISRPs specify how traffic flows should be distributed over the different RANs (for example, voice is only allowed to be carried over the 3GPP radio network while Internet video streaming and best-effort traffic can be routed via the Wi-Fi radio network). The ANDSF allows mobile operators to determine how UEs 205 connect to different RANs and to use that information for traffic planning. Simplified examples of ANDSF rules are given in Table 1 and Table 2 below.

Table 1 illustrates ANDSF rules that UE 205 may use to discover radio access networks in the vicinity of UE 205. The example includes two rules. The first rule states that WLAN access network "OperatorSSID812" is available in the area described by the geographical coordinates (AnchorLatitude=5536988; AnchorLongtitude=836620; Radius=40). The second rule states that WLAN access network "OperatorSSID1056" is available in two 3GPP cells, indicated by their respective cell IDs (UTRAN_CI=3048 and UTRAN_CI=4053).

TABLE 1

ANDSF MO - Discovery Information

| Access Network Type | Access Network Area | Access Network Info Ref |
|---|---|---|
| 3 (WLAN) | Geo_Location:<br>AnchorLatitude = 5536988<br>AnchorLongtitude = 836620<br>Radius = 40 | ID = 812<br>AddrType = SSID<br>Addr = OperatorSSID812<br>IP = <skipped><br>AuthInfo:<br>AuthType = HTTP-DIGEST<br>AuthName = Username<br>AuthSecret = Secret<br>Bearer Type = WLAN<br>BearerParam:<br>SecMode = 802.1X |
| 3 (WLAN) | 3GPP Location:<br>UTRAN_CI = 3048<br>UTRAN_CI = 4053 | ID = 1056<br>AddrType = SSID<br>Addr = OperatorSSID1056<br>IP = <skipped><br>AuthInfo:<br>AuthType = HTTP-DIGEST<br>AuthName = Username<br>AuthSecret = Secret<br>BearerType = WLAN<br>BearerParam:<br>SecMode = 802.1X |

Table 2 describes two rules that apply to the same location (in this case represented by geographical coordinates). Note that the rules overlap, since the first one characterizes all data-flows carried via ports 20 to 23 (all of which usually carry TCP traffic). At the same time, the second rule applies to all TCP traffic and is therefore more generic. In order to make sure that the Telnet and SSH traffic (ports 22 and 23 respectively) is carried over the 3GPP radio network, the first rule is given a higher priority (the lower number means higher priority).

TABLE 2

ANDSF MO - ISRP

| Rule Priority | ForFlowBased | Roaming | PLMN | UpdatePolicy |
|---|---|---|---|---|
| 1 | IPFlow:<br>StartSourcePortNumber = 22<br>EndSourcePortNumber = 23 (SSH, Telnet)<br>StartDestPortNumber = 22<br>EndDestPortNumber = 23<br>ValidityArea:<br>AnchorLatitude = 5536988<br>AnchorLongtitude = 836620<br>Radius = 40<br>RoutingRules:<br>AccessTechnology = 1 (3GPP) | 0 (UE not roaming) | 24009 | 0 (UE not required to update the policy) |
| 2 | IPFlow:<br>ProtocolType = 6 (TCP)<br>ValidityArea:<br>AnchorLatitude = 5536988<br>AnchorLongtitude = 836620<br>Radius = 40<br>TimeOfDay:<br>TimeStart = 170000<br>TimeStop = 180000<br>RoutingRules:<br>AccessTechnology = 3 (WLAN)<br>AccessId = OperatorSSID812 | 0 (UE not roaming) | 24009 | 0 (UE not required to update the policy) |

As discussed above, Wi-Fi can be deployed in various scenarios, such as private Wi-Fi, public Wi-Fi, and integrated Wi-Fi. In integrated Wi-Fi, the operator manages the network and controls access selection via a network based mechanism and/or ANDSF/HS2.0 policies sent to the UE. In private Wi-Fi and public Wi-Fi, access selection may be based on operator policies (ANDSF/HS2.0) in the future.

Although ANDSF may provide a framework for offloading traffic from a 3GPP network to a Wi-Fi network, ANDSF alone may be unreliable in areas with poor 3GPP coverage. That is, an ANDSF policy may indicate that a specific policy is valid for a region (such as a particular country), but the policy may be unreliable if portions of the region do not receive sufficient coverage (such as a forest within the particular country). So, if you are within the region indicated by ANDSF but outside of the network's coverage area, the ANDSF policy may not help. Some embodiments of the present disclosure may address this problem by facilitating a selection among multiple ANDSF policies based on the coverage that the wireless communication device receives at a particular location. For example, the wireless communication device may apply an out-of-coverage configuration management rule that allows for managing an ANDSF policy based on network coverage.

Figure 3:
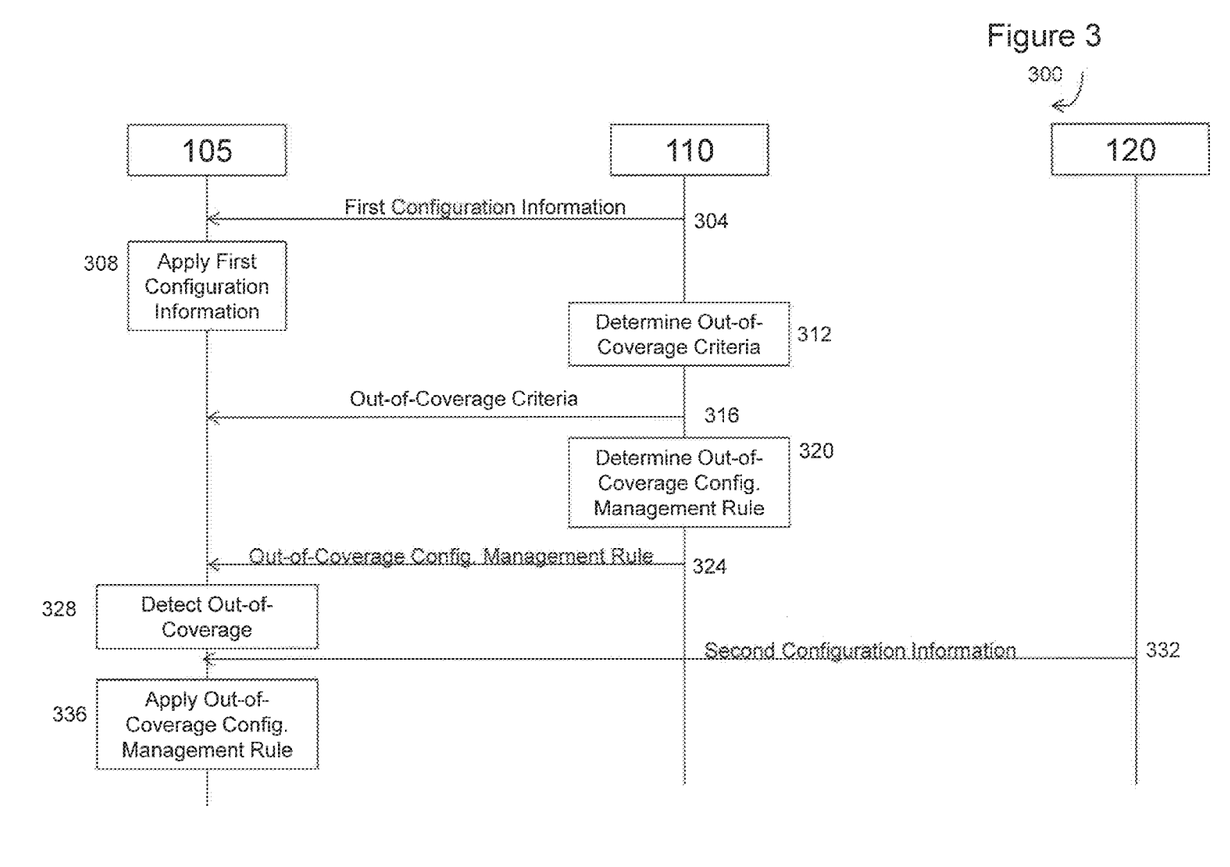
FIG. 3 is a signaling diagram illustrating an exchange of signals in an embodiment of a network.

FIG. 3 is a signaling diagram illustrating an exchange of signals in an embodiment of a network. The exchange begins at step 304 where 3GPP access node 110 communicates first configuration information to wireless communication device 105 located within a coverage area of the first network. The first configuration information is associated with the first network (e.g., the 3GPP network) in the sense that the first network selects the first configuration information, wireless communication device 105 receives the first configuration information from the first network, and/or wireless communication device 105 is instructed to act according to the first configuration information at least until wireless communication device 105 moves outside the coverage area of the first network. The first configuration information may include information that wireless communication device 105 can use to select an access node for connection, to determine settings to use when connecting to the access node, to set mobility related parameters (such as thresholds indicating under which conditions wireless communication device 105 should "handover" between the 3GPP network and the Wi-Fi network), and/or any other suitable polices, rules, or settings (such as parameter settings that wireless communication device 105 applies when in idle mode operation).

The first configuration information can include information about the first network (e.g., the 3GPP network) and one or more other networks (such as a Wi-Fi network in the vicinity of wireless communication device 105). As an example, first configuration information may include a policy comprising rules for selecting an access node for connection when multiple access nodes, such as 3GPP access nodes 110 and Wi-Fi access nodes 120, are available to wireless communication device 105. The policy could dictate or guide wireless communication device 105 how to select between two or more particular access node. So, if wireless communication device 105 is within range of access nodes 110A, 110B, and 120A, the policy may provide rules for selecting among these particular access nodes. Or, the policy could provide rules indicating when to connect to and/or steer traffic to a 3GPP-type access node 110 and when to connect to and/or steer traffic to a Wi-Fi-type access node 120. One rule might instruct wireless communication device to connect to a 3GPP access node 110 to exchange voice traffic and to connect to a Wi-Fi access node 110 to stream Internet data.

In some embodiments, the first configuration information is communicated when wireless communication device 105 is in connection mode with 3GPP access node 110. 3GPP access node 110 may update the first configuration information (i.e., the configuration information associated with the first network) at any suitable time. For example, 3GPP access node 110 may update first configuration information dynamically based on the current network load. If the 3GPP network is experiencing high traffic, it can update the first configuration information to encourage wireless communication device 105 to connect to the Wi-Fi network. If the 3GPP network is experiencing light traffic, it can update the first configuration information to encourage wireless communication device 105 to connect to the 3GPP network. As another example, 3GPP may update first configuration information based on subscription information so that devices associated with higher priority subscribers are instructed to connect to the network that provides better quality of service. As another example, 3GPP may update first configuration information periodically (such as once a month) in order to ensure wireless communication device 105 has up-to-date configuration information. In some embodiments, the first configuration information communicated in connection mode can instruct wireless communication device 105 how to act during idle mode.

In addition to sending the first configuration information, in some embodiments the network may optionally send alternative configuration information to wireless communication device 105. As an example, 3GPP access node 110 may send default configuration information (such as a default policy or policies) to be applied outside the whole coverage area of the 3GPP network. In one alternative, the network may send a default policy separate from the normal policies (e.g., the policies in the first configuration information), and it may thereby be understood that this would be the default policy. So, the default policy could be sent at connection set up and the rest of the policies could be sent at a later time. In another alternative, the network sends the default policy at the same time as other (non-default) policies but indicates which policy is the default policy. This could be done with a bit-indicator. The policies could be transferred in any of the radio access networks where the policies would apply and, thus, would not be limited to being sent in one particular network access type.

At step 308, wireless communication 105 device within the coverage area of the first network applies the first configuration information. Thus, wireless communication device 105 will act according to the policies, rules, and/or settings indicated by the first configuration information.

In some embodiments, 3GPP access node 110 determines out-of-coverage criteria at step 312. The out-of-coverage criteria indicate out-of-coverage events. Upon the occurrence of an out-of-coverage event, wireless communication device 105 is deemed to have moved out of the coverage area of the 3GPP network. Examples of out-of-coverage events include the signal strength that wireless communication device 105 receives from the network falls below a threshold, the signal strength that the network receives from the wireless communication device 105 falls below a threshold (as may be determined from an indicator that the network sends device 105), a radio link failure, and/or wireless communication device 105 is in a certain state (such as searching for a suitable cell to camp on or having detached from the 3GPP network). In some embodiments, an out-of-coverage event occurs when wireless mobile device 105 does a handover to another network (such as the Wi-Fi network or another operator's network) based on some rule or in response to the user manually selecting to connect to another network.

The out-of-coverage criteria may also include a pre-determined time period such that wireless communication device 105 is not deemed to have moved out of coverage until the duration of an out-of-coverage event exceeds the predetermined time period. The pre-determined time period can be the same or different for different types of out-of-coverage events. For example, a pre-determined time period configured for a radio link failure could be shorter than a pre-determined time period configured for a marginally low receive signal strength. The benefit of embodiments that use the pre-determined time period is that if wireless communication device 105 is out of coverage for a short period of time, the first configuration information may still be applicable during this short period of time and/or the first configuration information may be applicable when wireless communication device 105 re-enters the coverage. This may be useful where the wireless communication device quickly goes in and out of coverage as may happen in a partial network overlap (scenario B of FIG. 1) or intermittent "no overlap" of networks due to objects obstructing the propagation paths thereby creating short outages or other unavailability (scenario C of FIG. 1).

To implement the pre-determined period of time, wireless communication device 105 starts a timer upon the occurrence of an out-of-coverage event. If wireless communication device 105 re-enters coverage (because the out-of-coverage event ends or an in-coverage event occurs), wireless communication device 105 may stop the timer. If, however, wireless communication device 105 is still out of coverage and the timer expires, wireless communication device 105 may apply the out-of-coverage configuration management rule (discussed below) to discard, refrain from acting according to, and/or maintain the first configuration information.

At step 316, 3GPP access node 110 communicates the out-of-coverage criteria to wireless communication device 105 so that wireless communication device 105 can detect when it moves outside the coverage area of the first network. Although steps 312 and 316 describe an embodiment in which the network determines and sends the out-of-coverage event(s) and duration for the timer/pre-determined time period, in other embodiments the event(s) and duration may be preconfigured (e.g. specified in a specification), configured by the user, etc. Thus, in some alternative embodiments, wireless communication device 105 can detect when it moves outside the coverage area of the first network without having to receive the out-of-coverage criteria from the network.

At step 320, 3GPP access node 110 determines an out-of-coverage configuration management rule for the first configuration information. The out-of-coverage configuration management rule indicates how to manage the first configuration information if the wireless communication device moves outside the coverage area of the first network. The out-of-coverage rule can be tailored to various coverage scenarios in order to optimize performance for the wireless communication device itself as well as for the network as a whole. Thus, the out-of-coverage rule may indicate to discard configuration information, refrain from acting according to the configuration information, maintain the configuration information, and/or resume acting according to the configuration information depending on the coverage scenario.

As an example, the out-of-coverage rule may manage short term out-of-coverage scenarios differently than long term out-of-coverage scenarios. As another example, the out-of-coverage rule may manage coverage overlap scenarios differently depending on whether two networks have full, partial, or no coverage overlap. Thus, in some embodiments, if the networks have full coverage overlap (scenario A), the out-of-coverage configuration management rule may indicate to continue to act according to the first configuration information. If the networks have partial overlap (scenario B), the out-of-coverage configuration management rule may indicate to continue to act according to the first configuration information as long as wireless communication device 105 is connecting with the partially overlapping Wi-Fi access node 120B, but to stop act according to first configuration information if wireless communication device 105 is not connecting with the partially overlapping Wi-Fi access node 120B. If the networks have no overlap (scenario C), the out-of-coverage configuration management rule may indicate to discard or refrain from acting according to the first configuration information (either right away or after a period of time) such that wireless communication device acts according to different configuration information. The out-of-coverage configuration management rule may be optimized for various network topographies. Thus, other embodiments of scenarios A, B, and C may use different out-of-coverage configuration management rules than those described in the preceding example.

In one embodiment, the out-of-coverage configuration management rule may indicate that, in response to moving out of the coverage area of the first network, wireless communication device 105 should discard the first configuration information. In one embodiment, the out-of-coverage rule indicates to discard the first configuration information when leaving the coverage area of the 3GPP network. In this way, wireless communication device 105 may not act according to the first configuration information outside of the 3GPP coverage. For example, if wireless communication device 105 had received polices regarding Wi-Fi connection handling when being connected to the 3GPP network, it may not apply these policies in the case that wireless communication device 105 moves out of coverage of the 3GPP network or when it re-enters a 3GPP network (the previous 3GPP network or possibly another 3GPP network).

According to another example embodiment, the out-of-coverage configuration management rule indicates that, in response to moving out of the coverage area of the first network, wireless communication device 105 should maintain the first configuration information at wireless communication device 105. For example, first configuration information may be stored in local memory of wireless communication device 105 and/or wireless communication device 105 may refrain from removing the first configuration information. At any given time, wireless communication device may maintain any suitable amount of configuration information, such as first configuration information alone or first configuration information, second configuration information, and so on. Additionally, each instance of configuration information may include any suitable amount of information, such as one or more policies, one or more rules, and/or one or more settings.

In embodiments where the out-of-coverage configuration management rule indicates wireless communication device 105 should maintain (e.g., store/not delete) the first configuration information, wireless communication device 105 will not act according to the first configuration information outside of the coverage of the first network (in the example, the 3GPP network). Since wireless communication device 105 has stored the first configuration information, it can re-use the first configuration information upon returning to 3GPP coverage. Thus, during the time that wireless communication device 105 is outside the coverage of the first network, this alternative will achieve the same result as discarding the first configuration information in that device 105 will not act on the first configuration information. However, since wireless communication device 105 has not removed the policies, it can reuse them upon returning to the 3GPP network coverage area. This may reduce signaling load as configuration information will not need to be resent from the network.

In this embodiment, wireless communication device 105 may be configured to act according to second configuration information in response to moving outside the coverage area of the first network. The second configuration information may be an alternative configuration from the 3GPP network, a default configuration (such as a configuration specified in a standard), or a configuration received from a second network (such as the Wi-Fi network). The second configuration information could include a second policy comprising different rules for selecting an access node for connection when multiple access nodes are available to the wireless communication device.

The out-of-coverage configuration management rule may further indicate how to manage the first configuration information if wireless communication device 105 returns to the coverage area of the first network. For example, in response to detecting that the wireless communication device has returned to the coverage area of the first network, the out-of-coverage configuration management rule may indicate to act according to the first configuration information maintained at wireless communication device 105. In some embodiments, wireless communication device 105 retrieves the first configuration information from local memory to facilitate configuring wireless communication device to act according to the first configuration information. In particular implementations, the out-of-coverage configuration management rule indicates that wireless communication device 105 may only apply the stored first configuration information upon re-entering the same 3GPP network (but not apply the stored first configuration information from 3GPP network X when entering 3GPP network Y). In other embodiments, the out-of-coverage configuration management rule indicates that wireless communication device 105 may apply the first configuration information from 3GPP network X when entering 3GPP network Y.

According to other example embodiments, the out-of-coverage configuration management rule indicates to determine wireless communication device 105 has moved inside a coverage area of a second access node associated with a second network, such as Wi-Fi access node 120 associated with the Wi-Fi network. The out-of-coverage configuration management rule further indicates to determine whether the coverage area of the second access node overlaps the coverage area of the first network (e.g., the 3GPP network). The coverage overlap determination may be made dynamically based on current conditions (such as whether or not wireless communication device 105 receives sufficient signal strength from both the first network and the second network for a sufficient amount of time). Or, the coverage overlap determination may be made statically, such as if one of the networks communicates cell site information indicating access nodes of the other network that have overlapping coverage (e.g., based on the cell's geographic coordinates and cell coverage radius).

If the coverage area of the second access node overlaps the coverage area of the first network (such as scenario A or scenario B described with respect to FIG. 1), the out-of-coverage configuration management rule indicates to configure wireless communication device 105 to continue to act according to the first configuration information. If the coverage area of the second access node does not overlap the coverage area of the first network (such as scenario C described with respect to FIG. 1), the out-of-coverage configuration management rule indicates to configure wireless communication device 105 to act according to second configuration information. The second configuration information may be an alternative configuration from the 3GPP network, a default configuration (such as a configuration specified in a standard), or a configuration received from a second network (such as the Wi-Fi network).

In additional example embodiments, the out-of-coverage configuration management rule indicates that wireless communication device 105 should continue to act according to the first configuration information when moving out of the coverage of the first network (e.g., the 3GPP network) and within the coverage of the second network (e.g., the Wi-Fi network). If Wi-Fi access nodes 120 have been deployed for the sake of extending coverage of the 3GPP network, it may be necessary for wireless communication device 105 to also maintain certain policies of the first configuration information for when there is no 3GPP coverage. The policies could dictate, for example, which Wi-Fi access node 120A, 120B, or 120C and/or which Wi-Fi access network wireless communication device 105 should connect to when there is more than one Wi-Fi access node or network available. For example, the policy may give exclusivity or higher priority to a Wi-Fi SSID that belongs to the same operator that operates the 3GPP network instead of a Wi-Fi SSID that belongs to a third party. In some embodiments, the out-of-coverage configuration management rule may include information about how long wireless communication device should continue to act according to the first configuration information outside the coverage of the first network. This could be based on a timer, a coverage condition (e.g., as long as device 105 is in the coverage area of a particular Wi-Fi access node or network X), or indefinitely (e.g., until an updated out-of-coverage configuration management rule is received).

For embodiments that cause wireless communication device 105 to stop acting according to the first configuration information, the terminal may apply default configuration information (e.g., policy or behavior) with regards to connection handling in a second network, such as the Wi-Fi network. The default configuration information may be very simple, such as always connect to and/or steer traffic to Wi-Fi or never connect to and/or never steer traffic to Wi-Fi. This default policy may be predefined (e.g., specified in a specification), signaled from the 3GPP network to wireless communication device 105 (in advance of device 105 moving out of coverage), signaled from the Wi-Fi network to wireless communication device 105, configured by the user, etc.

In some example embodiments, the out-of-coverage configuration management rule indicates that wireless communication device 105 should continue to act according to first configuration information in the situation when wireless communication device has connected to Wi-Fi while in 3GPP coverage, but later moved out of 3GPP coverage while still having Wi-Fi coverage. This can happen in scenario B as depicted in FIG. 1 where wireless communication device 105 may have moved out of 3GPP access while having a Wi-Fi connection. If, for example, wireless communication device 105 is instructed to connect to Wi-Fi access node 120B when entering its coverage, it may be desirable for wireless communication device 105 to keep acting according to the first configuration information (such as a policy indicating to stay connected to Wi-Fi access node 120B) even when the 3GPP coverage is lost. The first configuration information could instruct wireless communication device 105 not to connect to an alternative 3GPP network or another Wi-Fi network that may have coverage in that particular location. For example, this may prevent wireless communication device 105 from connecting to a non-subscribed network when a subscribed network is available to wireless communication device 105. Thus, wireless communication device 105 may avoid incurring unnecessary fees associated with connecting to a non-subscribed network.

At step 324, 3GPP access node 110 communicates the out-of-coverage configuration management rule to wireless communication device 105. In some embodiments, 3GPP access node 110 communicates the out-of-coverage configuration management rule using an indicator, such as a bit-indicator. The indicator could be communicated at one or more of connection setup, handover, concurrently with the communication of the configuration information, in system broadcast information, or at any other suitable time.

In one embodiment, 3GPP access node 110 communicates out-of-coverage configuration management rule to indicate to wireless communication device 105 the behavior that should be applied with regards to configuration handling when outside the coverage area of the 3GPP network. The out-of-coverage configuration management rule may indicate whether or not wireless communication device 105 shall act according to the first configuration information outside the coverage area of the 3GPP network. The out-of-coverage configuration management rule may also indicate to wireless communication device 105 if wireless communication device shall maintain (e.g., store) or discard the first configuration information when moving out of the coverage area of the 3GPP network.

Although steps 320 and 324 describe an embodiment in which the network determines and sends the out-of-coverage configuration management rule, in other embodiments the rule may be preconfigured (e.g. specified in a specification), configured by the user, etc. Thus, in some alternative embodiments, wireless communication device 105 need not receive the out-of-coverage configuration management rule from the network.

At step 328, wireless communication device 105 detects that it has moved outside the coverage area of the first network (e.g., the 3GPP network) by applying the out-of-coverage criteria discussed with respect to steps 312 and 316 above. In some embodiments, wireless communication device 105 detects that it has moved outside the coverage area of the first network upon the occurrence of an out-of-coverage event or, for certain out-of-coverage events, if the duration of the out-of-coverage event exceeds a predetermined time period. As an example, if a network signal strength that wireless communication device 105 receives from the first network falls below a first threshold, wireless communication device 105 may detect that it has moved outside the coverage area of the first network (either right away or, alternatively, if the signal strength stays below the first threshold for a period of time). Other examples of out-of-coverage events include a device signal strength that the first network receives from wireless communication device 105 falls below a second threshold, a radio link failure, wireless communication device 105 enters a search state, wireless communication enters a network detachment state, and/or wireless communication device performs a handover from the first network to a second network.

When wireless communication device 150 moves out of the coverage area of the first network, it may move into the coverage area of a second network. The second network may use the same radio access technology as the first network (such as a second 3GPP network operated by a different operator) or a different radio access technology (which may or may not be operated by a different operator). FIG. 3 illustrates an example in which wireless communication device 150 moves into the coverage area of Wi-Fi access node 120.

In some embodiments, wireless communication device 150 receives second configuration information from Wi-Fi Access Node 120 at step 332. The second configuration information may include information that wireless communication device 105 can use to select an access node for connection, to determine settings to use when connecting to the access node, to set mobility related parameters (such as thresholds indicating under which conditions wireless communication device 105 should "handover" between the Wi-Fi network and the 3GPP network), and/or any other suitable polices, rules, or settings (such as parameter settings that wireless communication device 105 applies when in idle mode operation). The second configuration information can include information about the first network (e.g., the 3GPP network) and the second network (e.g., the Wi-Fi network). As an example, the second configuration information may include a policy comprising rules for selecting an access node for connection when multiple access nodes, such as 3GPP access nodes 110 and Wi-Fi access nodes 120, are available to wireless communication device 105. Although FIG. 3 illustrates sending the second configuration information from Wi-Fi access node 120 to wireless communication device 105, in other embodiments wireless communication device 105 may receive the second configuration information independently of Wi-Fi access node 120. For example, the second configuration information may correspond to a default configuration specified in a standard or an alternative configuration previously received from the first network and stored in memory of wireless communication device 105.

At step 336, wireless communication device 105 applies the out-of-coverage configuration management rule in response to detecting that it has moved outside the coverage area of the first network. Thus, wireless communication device 105 may discard the first configuration information, refrain from acting according to the first configuration information, maintain the first configuration information, resume acting according to the first configuration information (e.g., if device 105 re-enters the coverage area of the first network), and/or otherwise manage the first configuration information according to the out-of-coverage configuration management rule. The method then ends.

As described above, embodiments of a network may include one or more wireless communication devices and one or more different types of radio access nodes capable of communicating with the wireless communication devices. The network may also include any additional elements suitable to support communication between wireless communication devices or between a wireless communication device and another communication device (such as a landline telephone). A wireless communication device may include any suitable combination of hardware and/or software. For example, in particular embodiments, a wireless communication device may include the components described with respect to FIG. 4 below. Similarly, an access node may include any suitable combination of hardware and/or software. For example, in particular embodiments, an access node may include the components described with respect to FIG. 5 below.

Figure 4:
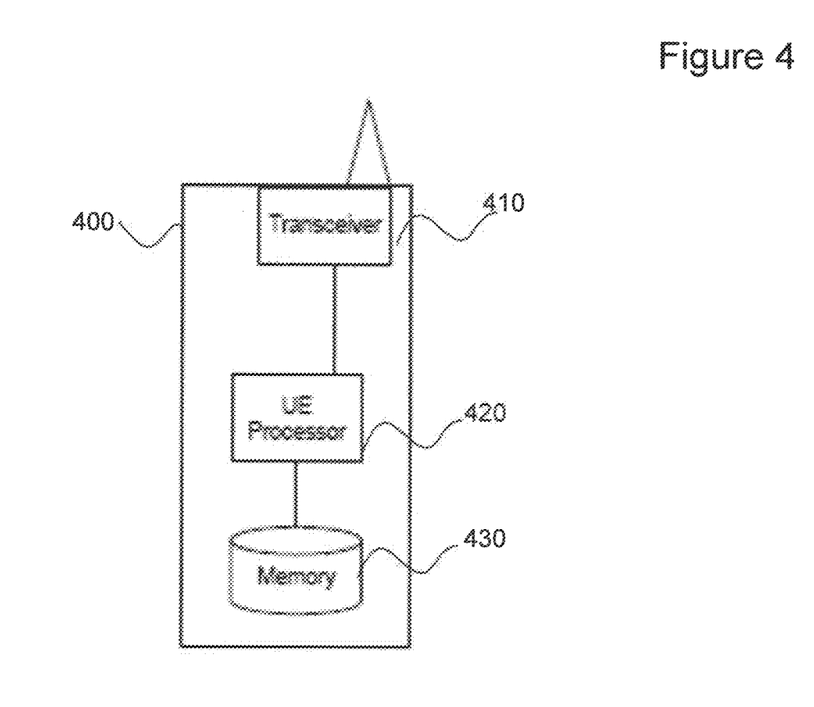
FIG. 4 is a block diagram illustrating embodiments of a wireless communication device.

FIG. 4 is a block diagram illustrating embodiments of a wireless communication device 400. Examples of wireless communication device 400 include a mobile phone, a smart phone, a PDA (Personal Digital Assistant), a portable computer (e.g., laptop, tablet), or other device that can provide wireless communication. A wireless communication device 400 may also be referred to as user equipment (UE), a station (STA), or a terminal in some embodiments. Wireless communication device 400 comprises transceiver 410, processor 420, and memory 430. In some embodiments, transceiver 410 facilitates transmitting wireless signals to and receiving wireless signals from an access node (e.g., via an antenna), processor 420 executes instructions to provide some or all of the functionality described above as being provided by wireless communication devices, and memory 430 stores the instructions executed by processor 420.

Processor 420 may comprise any suitable combination of hardware and software implemented in one or more modules to execute instructions and manipulate data to perform some or all of the described functions of wireless communication device 400. In some embodiments, processor 420 may include, for example, one or more computers, one or more central processing units (CPUs), one or more microprocessors, one or more applications, and/or other logic.

Memory 430 is generally operable to store instructions, such as a computer program, software, an application comprising one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of wireless communication device 400 may include additional components beyond those shown in FIG. 4 that may be responsible for providing certain aspects of the wireless communication device's functionality, including any of the functionality described above and/or any additional functionality (including any functionality necessary to support the solution described above).

Figure 5:
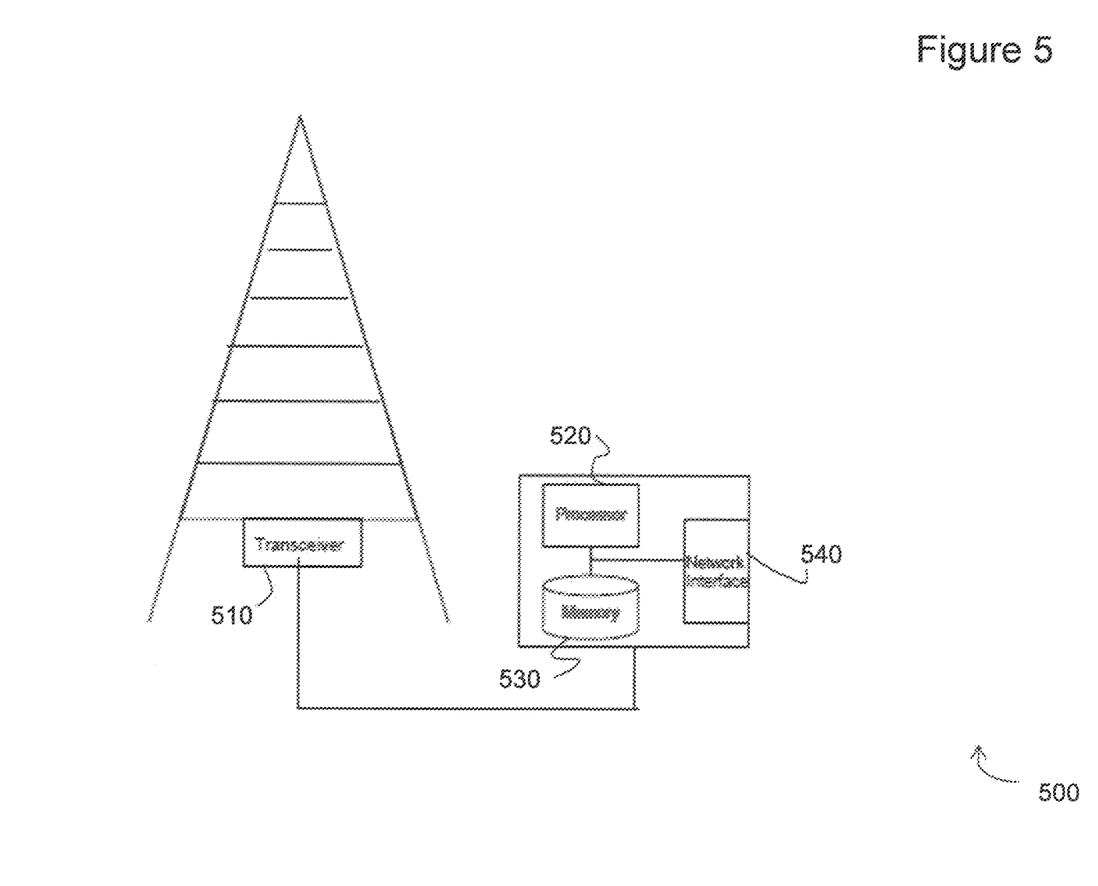
FIG. 5 is a block diagram illustrating embodiments of an access node.

FIG. 5 is a block diagram illustrating embodiments of an access node 500. Examples of access node 500 include an eNodeB, a base station, a Wi-Fi access point, and so on. Access node 500 comprises transceiver 510, processor 520, memory 530, and network interface 540. In some embodiments, transceiver 510 facilitates transmitting wireless signals to and receiving wireless signals from a wireless communication device (e.g., via an antenna), processor 520 executes instructions to provide some or all of the functionality described above as being provided by an access node, memory 530 stores the instructions executed by processor 520, and network interface 540 communicates signals to backend network components, such as a gateway, switch, router, Internet, Public Switched Telephone Network (PSTN), etc.

Processor 520 may comprise any suitable combination of hardware and software implemented in one or more modules to execute instructions and manipulate data to perform some or all of the described functions of access node 500. In some embodiments, processor 520 may include, for example, one or more computers, one or more central processing units (CPUs), one or more microprocessors, one or more applications, and/or other logic.

Memory 530 is generally operable to store instructions, such as a computer program, software, an application comprising one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for access node 500, send output from access node 500, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Alternative embodiments of access node 500 may include additional components beyond those shown in FIG. 5 that may be responsible for providing certain aspects of the access node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. For example, when the description indicates that the wireless communication device may connect to (or not connect to) a network, it may also imply that the wireless communication device may steer traffic to (or not steer traffic to) that network. Accordingly, the above description of the embodiments does not constrain this disclosure. Other changes, substitutions, and alterations are possible without departing from the spirit and scope of this disclosure, as defined by the following claims.

What is claimed is:

1. A method for managing configurations in a wireless communication device, comprising:
   determining that the wireless communication device is within a coverage area of a first network comprising a first access node;
   configuring the wireless communication device to act according to first configuration information associated with the first network, wherein the first configuration information comprises thresholds indicating conditions under which the wireless communication device should perform at least one of access network selection and traffic steering between a 3rd Generation Partnership Project (3GPP) network and a wireless local area network (WLAN);
   determining an out-of-coverage configuration management rule for the first configuration information, the out-of-coverage configuration management rule indicating how to manage the first configuration information if the wireless communication device moves outside the coverage area of the first network;
   detecting that the wireless communication device has moved outside the coverage area of the first network;
   in response to detecting that the wireless communication device has moved outside the coverage area of the first network, applying the out-of-coverage configuration management rule, wherein applying the out-of-coverage configuration management rule comprises refraining from acting according to the first configuration information; and
   in response to detecting that the wireless communication device has returned to the coverage area of the first network, acting according to configuration information associated with returning to coverage.

2. The method of claim 1, wherein:
   applying the out-of-coverage configuration management rule comprises:
   maintaining the first configuration information at the wireless communication device; and
   configuring the wireless communication device to act according to second configuration information in response to the wireless communication device moving outside the coverage area of the first network; and
   acting according to the configuration information associated with returning to coverage comprises configuring the wireless communication device to act according to the first configuration information maintained at the wireless communication device.

3. The method of claim 1, wherein applying the out-of-coverage configuration management rule comprises:
   determining that the wireless communication device has moved inside a coverage area of a second access node associated with a second network;
   determining whether the coverage area of the second access node at least partially overlaps the coverage area of the first network;
   if the coverage area of the second access node at least partially overlaps the coverage area of the first network, continuing to act according to the first configuration information; and
   if the coverage area of the second access node does not at least partially overlap the coverage area of the first network, configuring the wireless communication device to act according to second configuration information.

4. The method of claim 1, wherein:
applying the out-of-coverage configuration management rule comprises discarding the first configuration information in response to detecting that the wireless communication device has moved outside the coverage area of the first network and, as a result of the first configuration information having been discarded, the configuration information associated with returning to coverage corresponds to a second configuration.

5. The method of claim 1, wherein the method detects that the wireless communication device has moved outside the coverage area of the first network if a duration of an out-of-coverage event exceeds a predetermined time period.

6. The method of claim 1, wherein the method detects that the wireless communication device has moved outside the coverage area of the first network based on one or more of the following out-of-coverage criteria:
a network signal strength that the wireless communication device receives from the first network falls below a first threshold;
a device signal strength that the first network receives from the wireless communication device falls below a second threshold;
a radio link failure;
the wireless communication device enters a search state;
the wireless communication device enters a network detachment state; and
the wireless communication device performs a handover from the first network to a second network.

7. The method of claim 1, wherein the handover comprises steering traffic between the 3GPP network and the WLAN.

8. The method of claim 1, wherein the handover comprises connecting to the 3GPP network or the WLAN.

9. The method of claim 1, wherein the first configuration information is associated with an access network discovery and selection function (ANDSF) policy, and the out-of-coverage configuration management rule is configured to manage the ANDSF policy based on network coverage.

10. A wireless communication device operable to:
determine that the wireless communication device is within a coverage area of a first network comprising a first access node;
configure the wireless communication device to act according to first configuration information associated with the first network, wherein the first configuration information comprises thresholds indicating conditions under which the wireless communication device should perform at least one of access network selection and traffic steering between a 3rd Generation Partnership Project (3GPP) network and a wireless local area network (WLAN);
determine an out-of-coverage configuration management rule for the first configuration information, the out-of-coverage configuration management rule indicating how to manage the first configuration information if the wireless communication device moves outside the coverage area of the first network;
detect that the wireless communication device has moved outside the coverage area of the first network;
in response to detecting that the wireless communication device has moved outside the coverage area of the first network, apply the out-of-coverage configuration management rule, wherein applying the out-of-coverage configuration management rule comprises refraining from acting according to the first configuration information; and
in response to detecting that the wireless communication device has returned to the coverage area of the first network, act according to configuration information associated with returning to coverage.

11. The wireless communication device of claim 10, wherein:
to apply the out-of-coverage configuration management rule the wireless communication device is further operable to:
maintain the first configuration information at the wireless communication device;
configure the wireless communication device to act according to second configuration information in response to the wireless communication device moving outside the coverage area of the first network; and
to act according to the configuration information associated with returning to coverage comprises the wireless communication device acting according to the first configuration information maintained at the wireless communication device.

12. The wireless communication device of claim 10, wherein to apply the out-of-coverage configuration management rule the wireless communication device is further operable to:
determine that the wireless communication device has moved inside a coverage area of a second access node associated with a second network;
determine whether the coverage area of the second access node at least partially overlaps the coverage area of the first network;
if the coverage area of the second access node at least partially overlaps the coverage area of the first network, continue to act according to the first configuration information; and
if the coverage area of the second access node does not at least partially overlap the coverage area of the first network, configure the wireless communication device to act according to second configuration information.

13. The wireless communication device of claim 10, wherein to apply the out-of-coverage configuration management rule the wireless communication device is further operable to discard the first configuration information in response to detecting that the wireless communication device has moved outside the coverage area of the first network and, as a result of the first configuration information having been discarded, the configuration information associated with returning to coverage corresponds to a second configuration.

14. The wireless communication device of claim 10, wherein the wireless communication device detects that the wireless communication device has moved outside the coverage area of the first network if a duration of an out-of-coverage event exceeds a predetermined time period.

15. The wireless communication device of claim 10, further operable to detect that the wireless communication device has moved outside the coverage area of the first network based on one or more of the following out-of-coverage criteria:
a network signal strength that the wireless communication device receives from the first network falls below a first threshold;
a device signal strength that the first network receives from the wireless communication device falls below a second threshold;
a radio link failure;
the wireless communication device enters a search state;

the wireless communication device enters a network detachment state; and the wireless communication device performs a handover from the first network to a second network.

16. The wireless communication device of claim 10, wherein the handover comprises steering traffic between the 3GPP network and the WLAN.

17. The wireless communication device of claim 10, wherein the handover comprises connecting to the 3GPP network or the WLAN.

18. The wireless communication device of claim 10, wherein the first configuration information is associated with an access network discovery and selection function (ANDSF) policy, and the out-of-coverage configuration management rule is configured to manage the ANDSF policy based on network coverage.

19. A first access node associated with a first network and operable to:
communicate first configuration information associated with the first network to a wireless communication device located within a coverage area of the first network, wherein the first configuration information comprises thresholds indicating conditions under which the wireless communication device should perform at least one of access network selection and traffic steering between a 3rd Generation Partnership Project (3GPP) network and a wireless local area network (WLAN);
determine an out-of-coverage configuration management rule for the first configuration information, the out-of-coverage configuration management rule indicating how to manage the first configuration information if the wireless communication device moves outside the coverage area of the first network; and
communicate the out-of-coverage configuration management rule to the wireless communication device;
wherein the out-of-coverage configuration management rule instructs the wireless device to:
in response to detecting that the wireless communication device has moved outside the coverage area of the first network, apply the out-of-coverage configuration management rule, wherein applying the out-of-coverage configuration management rule comprises refraining from acting according to the first configuration information; and
in response to detecting that the wireless communication device has returned to the coverage area of the first network, act according to configuration information associated with returning to coverage.

20. The first access node of claim 19, wherein:
the out-of-coverage configuration management rule instructs the wireless communication device to maintain the first configuration information at the wireless communication device and to configure the wireless communication device to act according to second configuration information in response to the wireless communication device moving outside the coverage area of the first network; and
the configuration information associated with returning to coverage corresponds to the first configuration information maintained at the wireless communication device.

21. The first access node of claim 19, wherein the out-of-coverage configuration management rule instructs the wireless communication device to:
determine that the wireless communication device has moved inside a coverage area of a second access node associated with a second network;
determine whether the coverage area of the second access node overlaps the coverage area of the first network;
continue to act according to the first configuration information if the coverage area of the second access node overlaps the coverage area of the first network; and
configure the wireless communication device to act according to second configuration information if the coverage area of the second access node does not overlap the coverage area of the first network.

22. The first access node of claim 19, wherein the out-of-coverage configuration management rule comprises discarding the first configuration information in response to detecting that the wireless communication device has moved outside the coverage area of the first network and, as a result of the first configuration information having been discarded, the configuration information associated with returning to coverage corresponds to a second configuration.

23. The first access node of claim 19, further operable to:
communicate out-of-coverage criteria to the wireless communication device, the out-of-coverage criteria indicating how to detect when the wireless communication device moves outside the coverage area of the first network.

* * * * *